Sept. 18, 1962  N. PAVA  3,054,608

CANTILEVER SPRING SUPPORT BEARING

Filed Oct. 5, 1960

*INVENTOR.*
NORMAN PAVA
BY *Alfred W. Barber*
ATTORNEY

** 3,054,608
CANTILEVER SPRING SUPPORT BEARING
Norman Pava, North Bellmore, N.Y., assignor to Potter Instrument Company, Inc., Plainview, N.Y., a corporation of New York
Filed Oct. 5, 1960, Ser. No. 60,637
2 Claims. (Cl. 267—1)

The present invention concerns mechanical bearings and, in particular, hinge type bearings and the like.

Many mechanical devices utilize bearings of one type or another. Many of these devices also require a spring return means. The purpose of a bearing is usually to maintain a certain space relationship between parts in one or two dimensions while allowing motion in the remaining dimension. An ideal bearing among other requirements would be friction-free.

The present invention concerns a simple, inexpensive, and easy to use bearing which provides accurate positioning in required dimensions while permitting substantially friction-free motion in the remaining dimensions and which also provides almost any degree of spring return action. This bearing-spring device is formed by rolling both ends of a flat piece of spring material and inserting these ends in accurately formed holes and slots in the two parts to be hinged together. This type of spring hinge has many applications particularly in electro-mechanical devices such as relays, printing hammers and the like. Since there are no sliding surfaces involved, this spring-hinge has an extremely long life expectancy, is free from effects of wear and maintains its functional characteristics essentially without change.

Accordingly, one object of the present invention is to provide a spring-hinge which is simple, inexpensive and easy to install.

Another object is to provide a spring-hinge which is essentially friction-free and wear-free.

Still another object is to provide a spring hinge which provides accurate alignment between the hinged parts.

A further object is to provide a spring-hinge having an extremely long life expectance.

These and other objects will be apparent from the detailed description of the invention given in connection with the various figures of the drawing.

Figure 1:
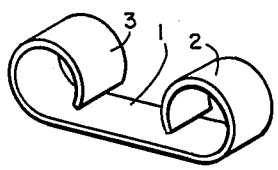
FIG. 1 shows a view in perspective of the essential part of the present invention.

FIG. 1 shows the spring device utilized in the spring-hinge of the present invention in which the spring body 1 is rolled up at each end 2 and 3 to form two accurately spaced coils. This spring may be formed by stamping or otherwise forming the rolled up ends 3 into approximately 270° of arc leaving an accurately determined flat section 1. The entire part 1 is heat treated to spring temper.

Figure 2:
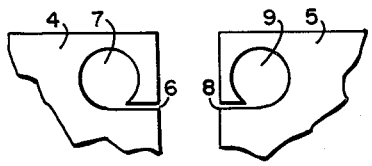
FIG. 2 shows the parts to be hinged and adapted to receive the hinge.

FIG. 2 shows the parts to be joined 4 and 5 with the accurately drilled or formed holes 7 and 9 and the communicating slots 6 and 8. The holes are slightly smaller than the outside dimension of the coiled spring ends while the slots should provide a close fit for the flat part of the spring.

Figure 3:
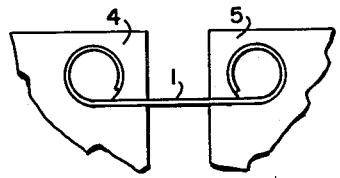
FIG. 3 shows a complete assembly of the spring hinge and the parts hinged together.

FIG. 3 shows how the spring 1 is assembled into the holes and slots joining parts 4 and 5 in a spring hinge relationship. The edges of slots 6 and 8 of FIG. 2 may be made tangent to the outsides of holes 7 and 9 so that spring 1—2—3 may be assembled in a press fit and without requiring any reverse bending of the spring, only a smooth continuous roll of the ends. With the spring fitting tightly into the holes and slots no lateral motion is possible in the assembly. The hinge or cantilever action is provided by the bending of the flat portion 1 of the spring. With no motion between surfaces, wear is practically eliminated. It will be seen that parts 4 and 5 are now joined by a substantially friction free spring-hinge which has no lost motion laterally. The stiffness of the hinge may be controlled to almost any degree by varying the thickness and width of the spring and by controlling the length and hole locations to provide desired spacing between the parts 4 and 5.

Figure 4:
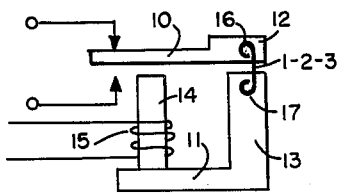
FIG. 4 shows one typical combination of the spring-hinge of the present invention as a part of a relay assembly.

FIG. 4 shows a typical combination of the spring-hinge in a relay assembly in which a relay consisting of frame 11, core 14, armature 10 and coil 15 is provided at 12 and 13 with holes 16—17 and slots to accept spring-hinge 1—2—3. This spring-hinge provides a superior mounting for the relay armature since it provides accurate positioning, friction-free operation and spring return and is capable of maintaining its characteristics over a long period of operation.

Figure 5:
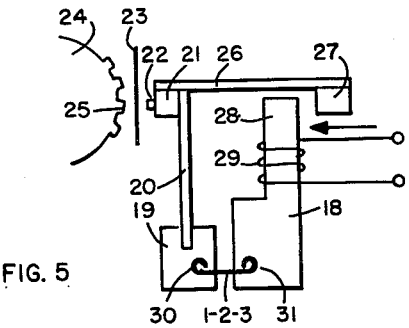
FIG. 5 shows another typical combination of a printing hammer assembly embodying the spring-hinge of the present invention.

FIG. 5 shows a spring-hinge printing hammer combination. In this combination frame 18 carrying core 28 and coil 29 is hinged to hammer base 19 by spring-hinge 1—2—3 inserted in holes and slots 30 and 31. The hammer structure is completed by arm 20 carrying hammer head 21, hammer face 22, armature coupling arm 26 and armature 27. When armature 27 is pulled toward core 28 by the application of current through coil 29, hammer face 22 presses printing paper 23 against one of type faces 25 carried by drum 24 or other suitable printing means. Here again as in the case of the relay above the combination is an advantageous one characterized by accurate positioning of hammer face 22, long life, friction free operation and precise spring return action.

While only a few embodiments of the present invention have been shown and described, many modifications will be apparent to those skilled in the art and within the spirit and scope of the invention as set forth specifically in the appended claims.

What is claimed is:

1. A spring support comprising two members to be joined, each of said members having holes near the surfaces of said members to be in proximity, slots communicating between said holes and said surfaces, and a spring member formed of flat strip spring material formed into circular loops at each end wherein said loops are mounted in said holes and said spring extends through said slots to form a cantilever spring connection supporting one of said members from the other.

2. A spring support comprising two members to be supported for limited relative movement, each of said members having portions adjacent each other and having holes in said adjacent portions, said holes being substantially circular, with a predetermined radial dimension, each of said adjacent portions having a slot extending from said hole and opening externally of each adjacent portion, both of said slots being substantially in the same plane, a substantially flat strip of spring material having a thickness to fit snugly in said slots, and each end of said strip being curved into substantially circular loops having an unflexed radial dimension larger than said predetermined radial dimension of said holes, whereby said strip forms a bearing support for one of said members relative to the other.

References Cited in the file of this patent

UNITED STATES PATENTS

| | | |
|---|---|---|
| 495,218 | Coe | Apr. 11, 1893 |
| 1,632,257 | Williams | June 14, 1927 |
| 2,680,641 | Schonitzer | June 8, 1954 |
| 2,947,067 | Vice et al. | Aug. 2, 1960 |

FOREIGN PATENTS

| | | |
|---|---|---|
| 1,045,369 | France | June 24, 1953 |